United States Patent [19]

Simionato

[11] Patent Number: 5,765,335
[45] Date of Patent: Jun. 16, 1998

[54] DEVICE FOR LOADING AND CIRCUMFERENTIAL DISTRIBUTION OF MATERIAL IN PACKAGING MACHINES

[75] Inventor: Paolo Simionato, Padua, Italy

[73] Assignee: Simionato S.p.A., Padua, Italy

[21] Appl. No.: 704,405

[22] Filed: Aug. 1, 1996

[30] Foreign Application Priority Data

Aug. 9, 1995 [IT] Italy .................................. MI95A1762

[51] Int. Cl.⁶ .................................................. B65B 35/54
[52] U.S. Cl. ............................. 53/154; 53/237; 414/301
[58] Field of Search ...................... 53/154, 237; 414/299, 414/301, 302

[56] References Cited

U.S. PATENT DOCUMENTS

| | | | |
|---|---|---|---|
| 2,219,954 | 10/1940 | Geiger et al. | 414/302 |
| 3,554,356 | 1/1971 | Milliken . | |
| 3,780,887 | 12/1973 | Bottoms | 414/301 X |
| 3,877,586 | 4/1975 | Quester | 414/302 X |
| 4,040,529 | 8/1977 | Wurdeman et al. | 414/301 |
| 4,611,965 | 9/1986 | Dixon et al. | 414/299 |
| 4,902,185 | 2/1990 | Dixon et al. | 414/301 |
| 5,372,467 | 12/1994 | Harris . | |

FOREIGN PATENT DOCUMENTS

| | | |
|---|---|---|
| 2 531 935 | 2/1984 | France . |
| 964 128 | 5/1957 | Germany . |
| 1 078 945 | 3/1960 | Germany . |
| 35 33 201 | 3/1987 | Germany . |
| 92 90 067.4 | 3/1994 | Germany . |
| 2 111 934 | 7/1983 | United Kingdom . |

*Primary Examiner*—Daniel Moon
*Attorney, Agent, or Firm*—Young & Thompson

[57] ABSTRACT

A device for loading and distribution of articles or material to be packaged in a packaging machine comprising an upper hopper for receiving the articles, a series of radial channels for conveying the articles towards peripheral points of collection of portions of articles a unit for distribution of the articles received via the hopper means to the conveying channels placed above said conveying channels, and drive means, provided for rotating the distribution unit around a vertical axis in order to consent the transfer of the articles to the conveying channels. In the device the distribution unit further comprises at least a first and a second distribution element extending radially and connected to each other in order to rotate together.

19 Claims, 3 Drawing Sheets

DEVICE FOR LOADING AND CIRCUMFERENTIAL DISTRIBUTION OF MATERIAL IN PACKAGING MACHINES

FIELD OF THE INVENTION

The present invention relates to a device for loading and ;tribution of articles or material, in packaging machines, rticularly in automated packaging machines.

BACKGROUND OF THE INVENTION

From the Italian patent application no. M193A001502 a )e of packaging machine is known as comprising a section loading and distribution of material having an upper feed pper which feeds the material to be packaged to an :ment for distribution of the material in the form of a ating conveyor belt which in turn transfers the product to plurality of underlying fixed radial channels arranged cumferentially which convey the material towards corre- onding product weighing buckets.

This type of material loader and distributor device has the ;advantage of performing circumferential distribution of ? product which is too slow. This is due mainly to the fact it said rotating conveyor belt must perform a full turn of 0° to distribute the product to all the radial channels low.

Another disadvantage to be found in previous loading and ;tribution devices consisted of the fact that with them only ;ingle product could be packaged at a time. It was not ssible to feed the underlying material transport channels th different materials, in view of a configuration of parate packagings of different products, or packaging thin each individual package predetermined portions of ferent products.

The object of the present invention is that of providing an proved device for loading and distribution of loose iterial, which can preferably be used in automated pack- ing machines and which enables the speed of distribution material or packaging yield of the bag-filling machine to increased considerably.

Another object of the present invention is that of provid- ; a perfected device for loading and distribution of loose iterial of the type referred above whereby packaging of at ist two different types of products has been made possible.

SUMMARY OF THE INVENTION

The previous objects are achieved by providing a device r loading and distribution of articles or loose material in ckaging machines comprising, upper hopper means for :eiving the articles, a series of radial channels for con- ying the articles towards peripheral points of collection of rtions of articles means for distribution of said articles :eived via said hopper means to said conveying channels iced above said conveying channels, and drive means ovided for rotating said distribution means around a rtical axis in order to consent the transfer of the articles to id conveying channels. According the invention, said ;tribution means comprise at least a first and a second ;tribution element extending radially and connected to ch other in order to rotate together.

By providing at least two elements for circumferential ;tribution which are angularly distanced one from the ier and attached to each other in order to rotate together ? product distribution operation can be accelerated com- red to that of previous devices.

Moreover the loading and distribution system of present vention is of simple construction in that single driving members, like in this case a single support and drive axis and corresponding motor, are usable for rotating two different distributing elements. Besides, the first and second distri- bution elements make possible to distribute simultaneously two different kinds of articles by using a single loading and distribution device.

BRIEF DESCRIPTION OF THE DRAWINGS

The present invention will be made clearer on reading the following description, relating to preferred embodiments of the invention, to be read with reference to the accompanying drawings, in which.

Figure 1:
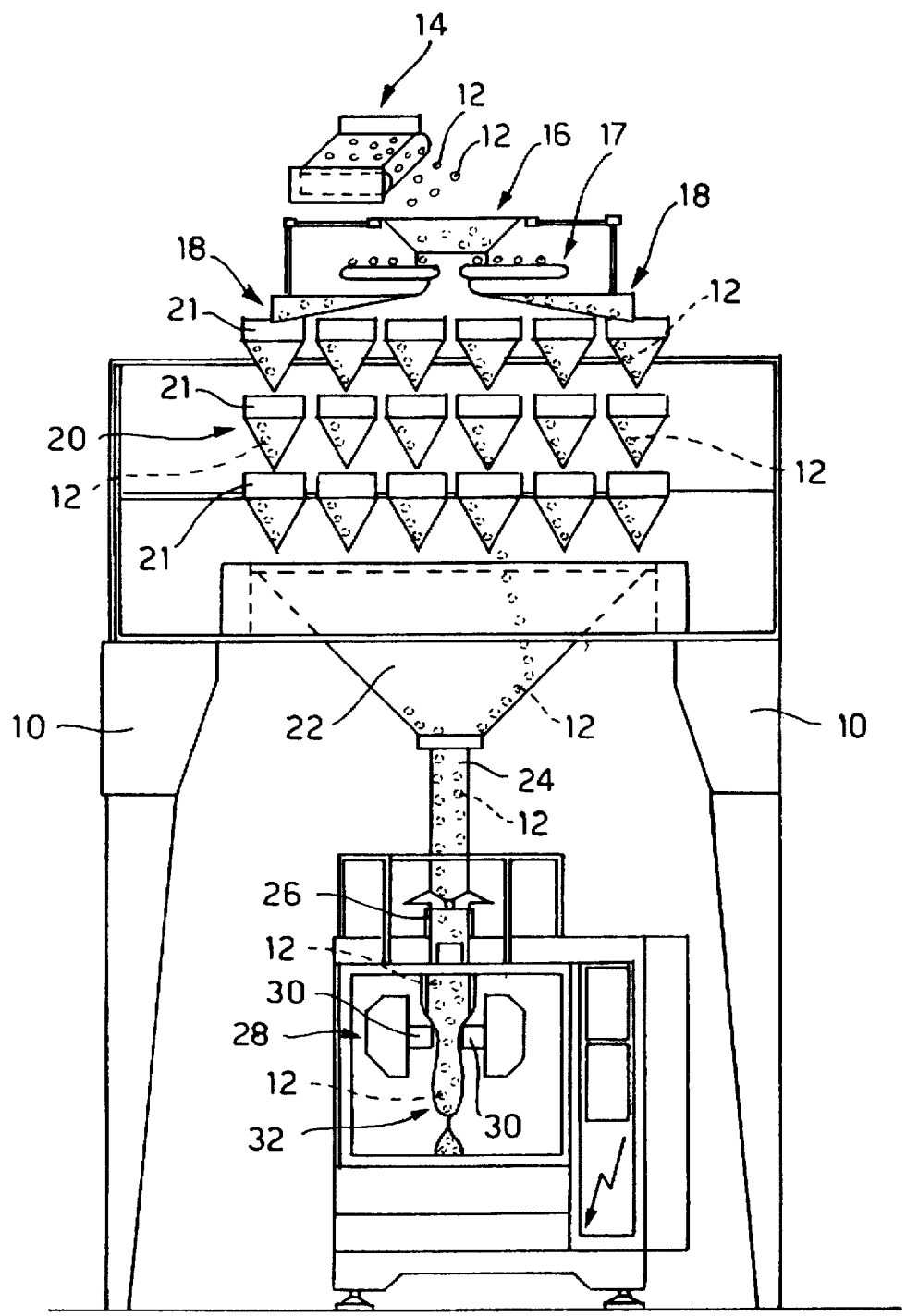
FIG. 1 is a side view of an automatic bag-filling machine using the device of the present invention.

PREFERRED EMBODIMENTS OF THE INVENTION 10 in FIG. 1 denotes the support framework of a generical bag-filling machine for a product 12 in pieces, which prod- uct is fed from above by means of a special conveyor belt 14 into an upper feed or receiving hopper 16 of the machine which transfers said product 12, via suitable channels 18, to the weighing section 20 comprising various series of buckets 21, arranged vertically.

The bag-filling machine provides, in series to the weigh- ing section 20, a funnel-shaped collector element 22 which conveys the weighed portions of product in a special pipe 24 outside whereof a tubular strip 26 in a heat-sealable material is made to slide.

The pipe 24 fills the tubular strip 26 intermittently with predefined portions of product, while a sealing unit 28, comprising opposite welding plates 30, welds the opposite edges of said strip 26 providing individual packages or bags 32 containing a predefined portion of the product 12. As shown, the device or section for loading and distribution of the material 12 of the bag-filling machine received via the conveyor belt 14 or another suitable means comprises, in addition to said feed hopper 16 and the radial channels 18 for conveying articles to peripheral points of collection of portions of articles, a unit 17 for circumferential distribution of the product which receives the material or articles from the hopper 16 and transfers it to each of the aforementioned channels 18.

Figure 2:
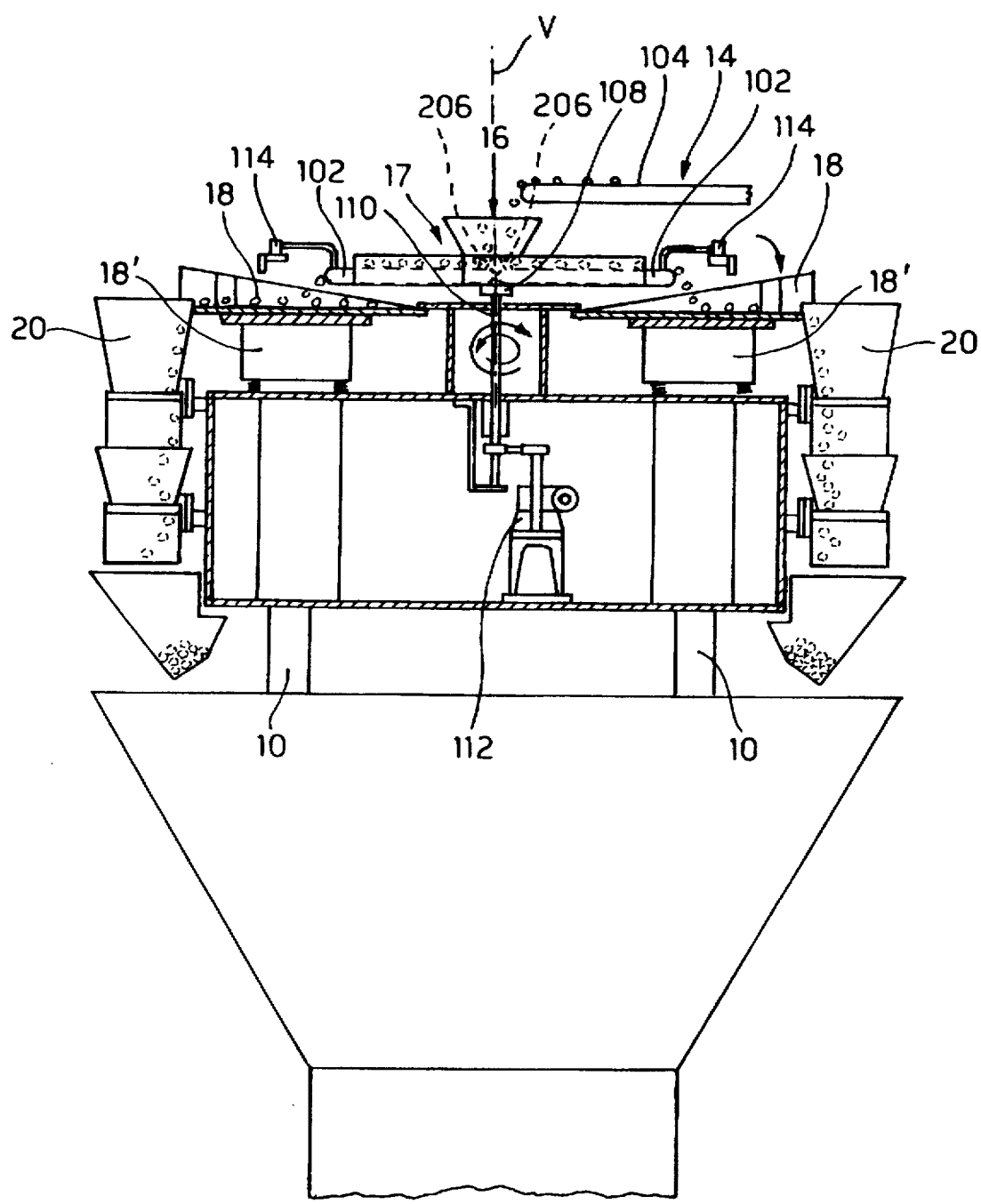
FIG. 2 is a lateral sectioned view of a first preferred embodiment of the present invention.
Figure 3:
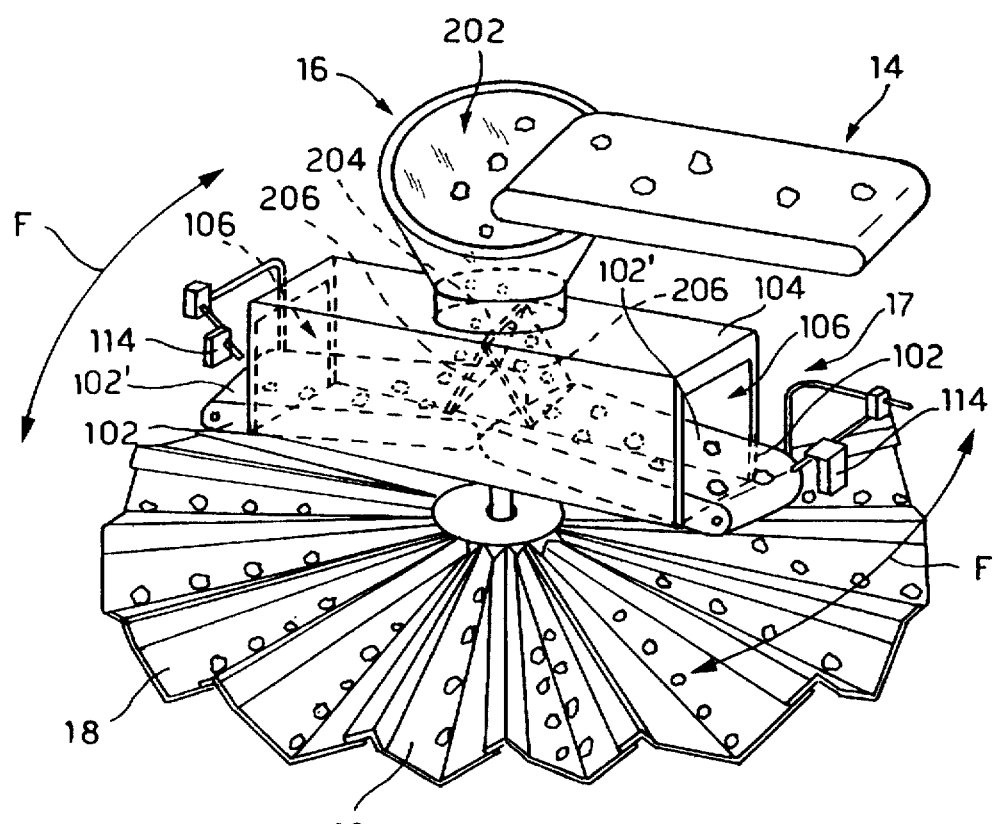
FIG. 3 is a perspective view of a main portion of the device according to the first embodiment of the present invention.

As shown better in the subsequent FIGS. 2 and 3, accord- ing to the present invention, said distribution unit 17 is composed of a first and second distribution element 102, 102 extending radially above said conveying channels 18, which are driven to move rotatably around a vertical axis V so as to transfer the product 12 to all the radial channels 18.

Said distribution elements 102, which in the present preferred embodiment are in the form of conveyor belts, are supported and covered by an elongated box-shaped body 104 which has opposite end apertures 106,106 wherefrom said conveyor belts 102, 102 project and extend beyond the respective ends of said box-shaped body. As can be seen from the figures, said conveyor belts 102, 102 comprise respective planes (102', 102') for supporting the articles which extend substantially horizontal or slightly inclined downwards.

The conveyor belts transfer the product to said transport channels 18 substantially at the median point of the latter and, by means of vibrations conferred by suitable vibratory elements 18' to the channels, the radial movement of the material contained in the channels 18 and the transfer of the material to the weighing buckets 21 are obtained.

Said box-shaped support and containing body 104 is attached to an underlying flange 108 borne at the end of a vertical drive shaft 110.

Said vertical shaft 110 is driven by a suitable motor 112, via a suitable transmission system, to perform a rotary movement whereby circumferential distribution of the material by the conveyor belts 102 is possible, the latter in turn driven to rotate in order to move the same material forwards, in radial direction, towards the end of the belt wherefrom said material is allowed to drop onto said transport channels 18.

The figures do not show the means for driving the forward movement of the conveyor belts which allows the material to be transported from the pick-up point below the lower aperture of the hopper towards the end point of falling and transfer of the material to said underlying transport channels 18.

The arrangement of at least two circumferential product distribution elements allows the circumferential product distribution speed and consequently the bag-filling yield of the packaging machine to be increased.

114 in FIGS. 2 and 3 denotes optical means for detecting the presence of product on the transport channel 18. The signal received from the latter enables the rotation drive motor 112 to be commanded thanks to suitable control means, not shown in the accompanying drawings.

As can be seen from the figures, the optical means 114, 114 for detecting the presence of articles on the transport channels 18 are suitably supported by the distribution elements 102, 102 for rotating with the same distribution elements (102, 102).

As shown, said distribution elements 102 and the relative support box 104 are cantilever-attached on said drive shaft 110, so that said distribution elements 102 are aligned one with the other.

The fact of arranging said distribution elements one on the extension of the other allows the support shaft to be forced in a balanced manner so that it is not subject to bending which, in addition to subjecting the resistant sections of said shaft to an excessive level of tensions which caused breakages, forcing their section to be oversized, generates irritating vibrations which may cause breakage through fatigue of parts of the components of the machine and risk damaging the material distributed.

In a preferred manner, according to the present invention, the motor 112 drives said central support shaft 110 and the distribution elements 102 mounted thereon to rotate reciprocatingly in the two angular directions, shown by the arrows F in FIG. 3, covering angular distances corresponding to only half of the complete turn angle, that is to say for angles equal to 180°.

Above said box 104, which also serves to prevent the product from falling from the distribution elements 102, said hopper 16 is attached and which has its outlets at an upper hole of said box.

The feed hopper 16, with an upward tapering truncated cone shape and the traditional wide upper aperture 202 for inserting the material, also has, according to the present invention, two lower openings for transfer of the product 204, 204 respectively, through which chutes 206, 206 pass and convey the product onto a respective distribution element 102.

The chutes 206, 206 extend from the respective outlet of the hopper 204 until almost touching the upper conveying surface of the respective conveyor belt 102 near the receiving end of the latter situated in a substantially central position of the device.

As can be seen from the figures, the chutes (206, 206) are inside the box-shaped body (104).

Figure 4:
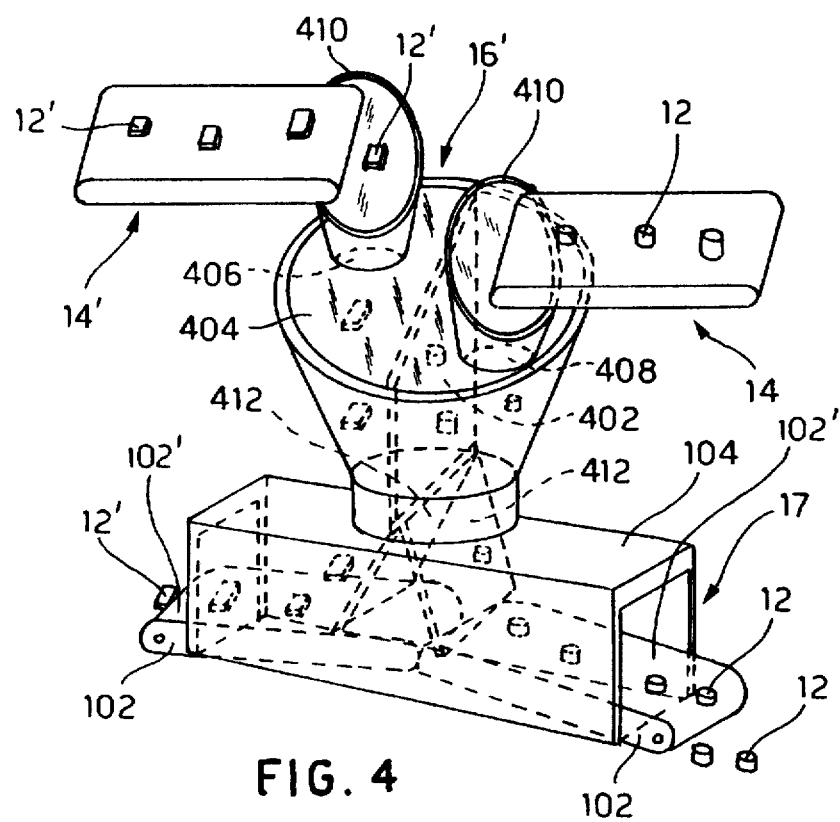
FIG. 4 is a perspective view of a detail relating to a second embodiment of the device of the present invention.

FIG. 4 shows a second preferred embodiment of the present invention. In this FIG. 4 the elements similar or equivalent to those of the previous figures are denoted by the same reference numerals.

This second embodiment also comprises a feed hopper 16', also in the form of a hollow body open at both ends, suitable for receiving from above the material to be packaged and for transferring below the material received to said distribution elements 102. Like the hopper of the first preferred embodiment said hollow body 16' of the hopper comprises a peripheral wall with a substantially truncated cone shape which widens upwards. According to a further feature of the present invention the hopper 16' of this second embodiment is provided with at least one internal wall 402 which divides the internal volume of the hopper into two separate compartments intended for collection of two different materials.

In this way it would be possible to feed two different products 12 and 12' coming from two different conveyor belts 14 and 14', which are conveyed on a respective distribution element 102 and from here to the weighing buckets.

In this second preferred embodiment shown here, each of said two compartments has a respective chute 412 suitable for conveying the material onto respective distribution elements 102 below. Said conveying chutes extend from the lower end of said division wall 402. This allows the bag-filling machine to be used for packaging simultaneously two different types of product in separate packages.

This had not been possible hitherto. The flexibility of use of this bag-filling machine is thus considerably increased.

Said hopper is also provided with an upper covering wall 404 having at least a first and a second aperture 406, 408, positioned near opposite peripheral edges of the covering wall 404, provided for inserting material in a respective compartment of the hopper.

According to a further feature of the invention shown in this second embodiment, above each aperture 406, 408 of the upper covering wall 404 a respective funnel-shaped element 410 is mounted for collection of the material.

As shown in FIG. 4, each of said material collection elements 410, 410 is in the form of a hollow body with a truncated cone shape widening upwards and open above to receive the material and having a lower hole corresponding to and facing a respective aperture 406, 408 in the upper covering wall 404.

Said internal division wall 402 is in the form of a flat panel arranged vertically in the centre of the hopper to divide said hopper into two identical and symmetrical compartments.

It is naturally understood that what has been written and shown with reference to the preferred embodiments of the present invention has been given purely by way of a non-limiting example of the principle claimed.

What is claimed is:

1. A device for loading and distribution of articles or material to be packaged in a packaging machine comprising upper hopper means for receiving the articles, a series of radial channels for conveying the articles towards peripheral points of collection of portions of articles means for distribution of said articles received via said hopper means to said conveying channels placed above said conveying channels, and drive means provided for rotating said distribution means around a vertical axis in order to consent the transfer of the articles to said conveying channels; wherein said distribution means comprise at least a first and a second distribution element extending radially and connected to each other in order to rotate together.

2. A device for loading and distribution of articles according to claim 1, wherein said distribution elements are arranged one on the extension of the other.

3. A device for loading and distribution of articles according to claim 1, wherein each of said distribution elements comprise a respective plane for supporting the articles mobile for conveying the articles radially.

4. A device for loading and distribution of articles according to claim 1, wherein said distribution elements extends radially substantially horizontal or slightly inclined downwards.

5. A device for loading and distribution of articles according to claim 1, wherein said means for driving the rotation of said distribution elements provide a reciprocating rotary movement for said distribution elements.

6. A device for loading and distribution of articles according to claim 1, wherein the hopper means has for each of said distribution elements a respective chute for conveying articles onto the corresponding distribution elements.

7. A device for loading and distribution of articles according to claim 6, wherein each of said chutes extend from the respective outlet of the hopper means until almost touching an upper surface of a respective conveyor belt near a receiving end of the respective conveyor belt situated in a substantially central position of the device.

8. A device for loading and distribution of articles according to claim 1, wherein the said hopper means comprise at least one internal wall which divides the internal volume of the hopper means into at least a first and a second separate compartments which can be used for conveying respective different kinds of articles.

9. A device for loading and distribution of articles according to claim 8, wherein the hopper means have an upper covering wall having at least a first and a second aperture, each provided for a respective compartment of the hopper means.

10. A device for loading and distribution of articles according to claim 9, wherein above each aperture of the upper covering wall a respective articles collection element is mounted.

11. A device for loading and distribution of articles according to claim 10, wherein each of said articles collection elements is in the form of a hollow body with a truncated cone shape widening upwards and open above to receive the articles and having a lower hole corresponding to and facing the respective aperture of the main hopper means.

12. A device for loading and distribution of articles according to claim 10, wherein said apertures for insertion of the articles in the compartments are provided near opposite peripheral edges of the covering wall.

13. A device for loading and distribution of articles according to claim 8, wherein each of said compartments has a respective chute suitable for conveying the articles onto respective units below and said conveying chutes extend from the lower end of said division wall.

14. A device for loading and distribution of articles according to claim 8, wherein said internal division wall is in the form of a flat panel arranged vertically in the center of the hopper means to divide said hopper means into two identical and symmetrical compartments.

15. A device for loading and distribution of articles according to claim 1, wherein said distribution elements are supported and covered by an elongated box-shaped body which has opposite end apertures wherefrom conveyor belts project and extend beyond the respective ends of said box-shaped body.

16. A device for loading and distribution of articles according to claim 15, wherein said box-shaped support and containing body is supported by a single central drive shaft.

17. A device for loading and distribution of articles according to claim 15, wherein chutes are inside the box-shaped body.

18. A device for loading and distribution of articles according to claim 1, wherein means are provided for detecting the presence of article on the conveying channels.

19. A device for loading and distribution of articles according to claim 18, wherein said means for detecting the presence of articles on the conveying channels comprises optical means suitably supported for rotating with the distribution elements.

* * * * *